United States Patent
Naito et al.

(10) Patent No.: US 6,671,744 B1
(45) Date of Patent: Dec. 30, 2003

(54) ACCESS CONTROL METHOD FOR DRIVE UNITS, AND A DRIVE UNIT USING THE METHOD

(75) Inventors: Kazunori Naito, Kawasaki (JP); Masahiro Ito, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/496,716

(22) Filed: Feb. 2, 2000

(30) Foreign Application Priority Data

Jul. 5, 1999 (JP) .......................................... 11-190903

(51) Int. Cl.[7] .............................. G06F 13/10; G06F 9/00
(52) U.S. Cl. ...................... 709/321; 709/326; 709/328; 713/1; 395/681
(58) Field of Search ............................... 709/321–327, 709/1, 100–108; 395/681; 710/63; 711/113

(56) References Cited

U.S. PATENT DOCUMENTS

| | | | | |
|---|---|---|---|---|
| 4,833,600 A | * | 5/1989 | Brodsky ..................... | 709/250 |
| 5,289,581 A | * | 2/1994 | Berenguel et al. .......... | 711/113 |
| 5,307,491 A | * | 4/1994 | Feriozi et al. .............. | 709/326 |
| 5,778,226 A | * | 7/1998 | Adams et al. .............. | 709/311 |
| 5,819,107 A | * | 10/1998 | Lichtman et al. ............... | 710/8 |
| 6,216,196 B1 | * | 4/2001 | Elwell et al. ............... | 710/240 |

FOREIGN PATENT DOCUMENTS

JP          6309265          11/1994

* cited by examiner

*Primary Examiner*—Majid A. Banankhah
*Assistant Examiner*—Kenneth Tang
(74) *Attorney, Agent, or Firm*—Greer, Burns & Crain, Ltd.

(57) ABSTRACT

An access control method for drive units that can recognize drive units in specific groups, and drive units to which the method applies are disclosed. The method includes the steps of generating a device driver start request by a driver control program when the OS starts; sending a check command on the basis of the device driver start request; loading the specific device driver corresponding to the specific code contained in the response from the drive unit for the check command; and converting a predetermined host command by the specific device driver and sending the corresponding command to the drive unit under the specific device driver when the predetermined host command for the drive unit under the specific device driver is sent from the host device.

6 Claims, 6 Drawing Sheets

| Relative position | Value | Description |
|---|---|---|
| 0 | 0xf0 | Command number |
| 1 | 0x00 | LUN |
| 2 | 0x00 | Reserve |
| 3 | 0x00 | Reserve |
| 4 | 0x00 | Reserve |
| 5 | 0x00 | Reserve |
| 6 | 0x00 | Reserve |
| 7 | 0x00 | Reserve |
| 8 | 0x04 | Transfer data length |
| 9 | 0x00 | Transfer data length |

| Relative position | Data |
|---|---|
| 0 | "F" |
| 1 | "U" |
| 2 | "J" |
| 3 | "I" |

ACCESS CONTROL METHOD FOR DRIVE UNITS, AND A DRIVE UNIT USING THE METHOD

BACKGROUND OF THE INVENTION

1. Field of the Invention

This invention relates to an access control method for drive units and the drive units using the method.

2. Description of the Related Art

Various drive units are connected to information processing equipment such as personal computers via interfaces. For example, computer system 10 shown in FIG. 7 contains floppy disk drive 24 and magneto-optic disk (MO) drive 20 in personal computer main unit 12.

Keyboard 16 and mouse 18 are connected as input devices, and display unit 14 is connected as an output device to personal computer main unit 12. MO cartridge 22 is inserted as recording media into MO drive 20.

To transfer data to or from personal computer main unit 12, a device driver program (hereinafter called a driver or device driver) controls access to drive units such as MO drive 20 via interfaces.

FIG. 8 shows an outline of the connection between personal computer main unit 12 as high-level information processing equipment and MO drive 20 as an example of the drive unit. Operating system (OS) 120 and device driver 121 for the MO drive 20 are installed and stored on the hard disk drive of personal computer main unit 12, which is a high-level device.

MO drive 20 to be accessed by personal computer main unit 12, which is a high-level device, has command processing section 201 that performs command and data transfer with personal computer main unit 12 via interface unit 200.

Command processing section 201 generally includes a command control program in firmware. It also has mechanical and optical head processing section 202. The command control program controls reading from, and writing to MO cartridge 22, which is recording media, via mechanical and optical head processing section 202, based on a command received by command processing section 201.

The driver is required for controlling access to a drive unit by using information-processing equipment as the high-level device.

Suppose that two or more different drive units are connected to the personal computer. For example, drive unit information on each drive unit is acquired by issuing a command by the device driver corresponding to the driver unit connected to each I/O bus during power-on as described in the unexamined laid open Japanese patent publication No. 5-2550. Then, drive unit access is controlled according to the drive unit information.

Recently, Windows95 and Windows NT (registered trademarks of Microsoft Corporation) have been widely used as the OSs of personal computers. Drive units such as storage units that are controlled by these OSs have various interface specifications.

These interface specifications or logical specifications are standardized. For example, there are the ATA, ATAPI, and SCSI standards. Therefore, drive units having these interfaces require general device drivers, which do not need to be prepared for each model.

If these device drivers have common specifications, fewer problems occur during execution by the OS. It is also advantageous in that two or common drivers under the OS can access more drive units.

However, value cannot be added to each drive unit. For example, a drive unit developer may develop a device by differentiating it from the drive units of other companies such as by equipping it with a superior cache function. In this case, even if the drive unit having the superior cache function is connected to a personal computer together with the driver units of other companies, the developer will naturally want the superior cache function to work effectively in the drive unit.

As stated earlier, however, when a general-purpose driver can control access to multiple drive units under an OS, the general-purpose driver can only provide general-purpose functions even if a drive unit has the above differentiated and effective function.

When only a certain drive unit out of all of the drive units connected to a personal computer has a differentiated and effective function, in the worse case, an attempt to use that function may effectively cause the system to shut down.

The technology described in the unexamined laid open Japanese patent publication No. 6-309265 makes it possible to acquire device information such as device and vendor codes by using the inquiry command defined in the ATAPI and SCSI interfaces, and select a device driver fit for the target drive unit on the basis of that information.

Even in the above case, a device driver is specified for each drive unit. Therefore, when two or more drive units share the differentiated and effective function, device drivers need to be specified for these drive units.

This causes a problem if the model is changed or a new device or vendor code is assigned at an OEM supplier; in such case, the new model or another model with a new device or vendor code will be recognized as a different drive unit.

SUMMARY OF THE INVENTION

The objective of the present invention is therefore to provide an access control method and drive units to which the method applies, such access control method, even if a drive unit having a specific differentiated function is connected together with other drive units to a high-level device, allowing the corresponding device driver to determine the drive unit having the specific differentiated function among other drive units.

The further objective of the present invention is to provide an access control method and drive units to which the method applies, such access control method allowing the system to recognize the drive units having the specific differentiated function as a group, and thereby determine the proper driver even if models are changed.

It is a feature of the present invention to allow the system to authenticate drive units by using a group code for data request commands from application programs and device drivers so that the added function is enabled for the drive unit group.

Preferably, as an example of the present invention, an access control method for drive units which are connected to the high-level device via interfaces, and in which a property indication code is set; such access control method includes the steps of:

generating a device driver start request by the driver control program when the OS starts;

sending a check command on the basis of the device driver start request;

loading the specific device driver corresponding to the specific code contained in the response from the drive unit for the check command; and sending the corresponding command to the drive unit under the specific device driver, when a predetermined high-level command for the drive unit under the specific device driver is sent from the high-level device.

Also preferably, in the configuration, as an example of the present invention, such access control method includes the step of:

converting a predetermined high-level command into the corresponding command by using the specific device driver when the predetermined high-level command for the drive unit is sent from the high-level device.

Also preferably, an example of the present invention, an access control method for drive units which are connected to the high-level device via interfaces, and in which a property indication code is set; such access control method includes the steps of:

generating a device driver start request by the driver control program when the OS starts;

sending a check command to the drive unit on the basis of the device driver start request;

loading the group device driver corresponding to the group code contained in the response from the drive unit for the check command; and sending the group command corresponding to a predetermined high-level command to the drive unit that includes the group code in the response when the predetermined high-level command for the drive unit is sent from the high-level device.

Also preferably, in the configuration, as an example of the present invention, such access control method includes the step of:

converting a predetermined high-level command into the corresponding group command by the group device driver when the predetermined high-level command for the drive unit is sent from the high-level device.

Also preferably, as an example of the present invention, such access control method being characterized by a configuration in which:

the check command includes at least the command number associated with the command that recognizes the specific code, and transfer data length information, and a response from the drive unit corresponding to the check command contains the data length determined by the transfer data length information and includes the specific code in the data length.

Also preferably, as an example of the present invention, such access control method being characterized by common assignment of the group code to a group of drive units.

Other features of the present invention are clarified by the execution conditions of the invention explained using the figures given below.

DESCRIPTION OF THE PREFERRED EMBODIMENTS

Figure 1:
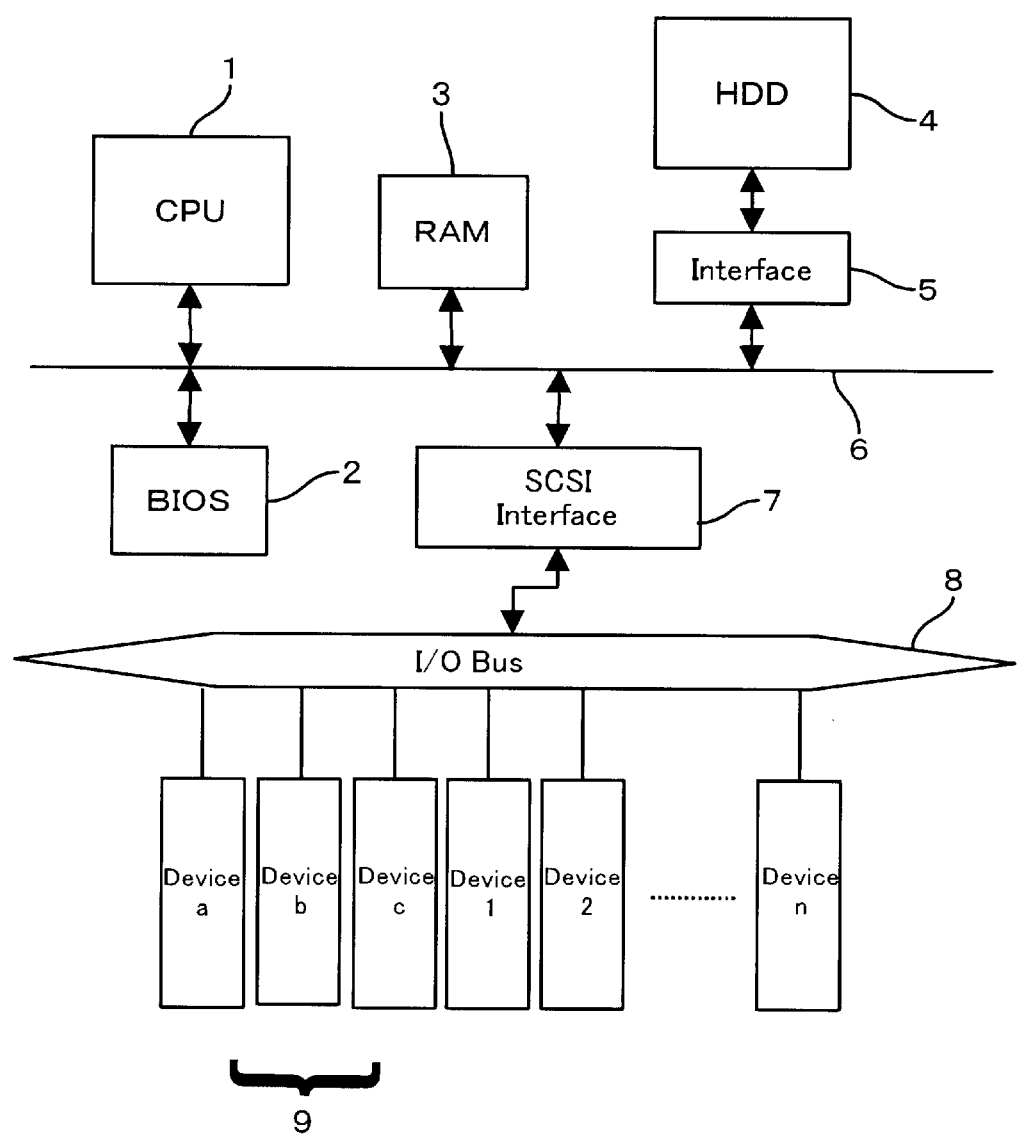
FIG. 1 is the block diagram example of the information processing equipment according to the present invention.

Embodiments of the present invention will now be explained, by referring to the drawings. The same reference number or sign is used to denote the same or similar portions in the drawings.

FIG. 1 is a block diagram example of the information processing equipment according to the present invention. CPU 1, BIOS memory 2, main memory 3, and hard disk drive unit 4 are connected to internal bus 6 via ATAPI interface 5.

Various drive units 1 to n and a to c connected to I/O bus 8 are connected to internal bus 6, for example, via SCSI interface 7.

Access to driver units 1 to n above is controlled by a general-purpose driver. Drive units a to c are included in group 9 as drive units having a differentiated superior function such as, for example, a high-speed function.

Drive units a to c included in group 9 have the superior function differentiated from the other drive units 1 to n under access control by the general-purpose driver.

Figure 2:
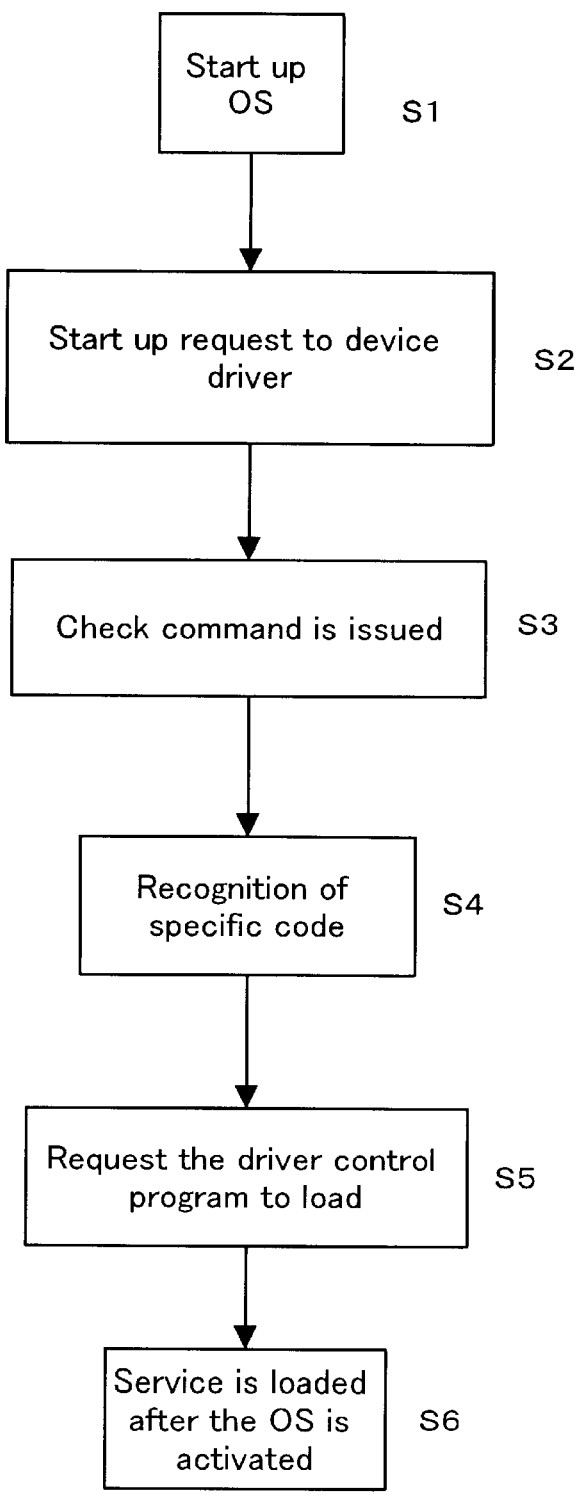
FIG. 2 is the operation flowchart of the present invention in the configuration shown in FIG. 1.

FIG. 2 is the operation flowchart of the present invention in the configuration of FIG. 1. When the computer system in FIG. 1 is turned on, the BIOS program in BIOS memory 2 loads the OS, stored on hard disk 4, into main memory 3, then the OS is activated.

Figures 3, 4:
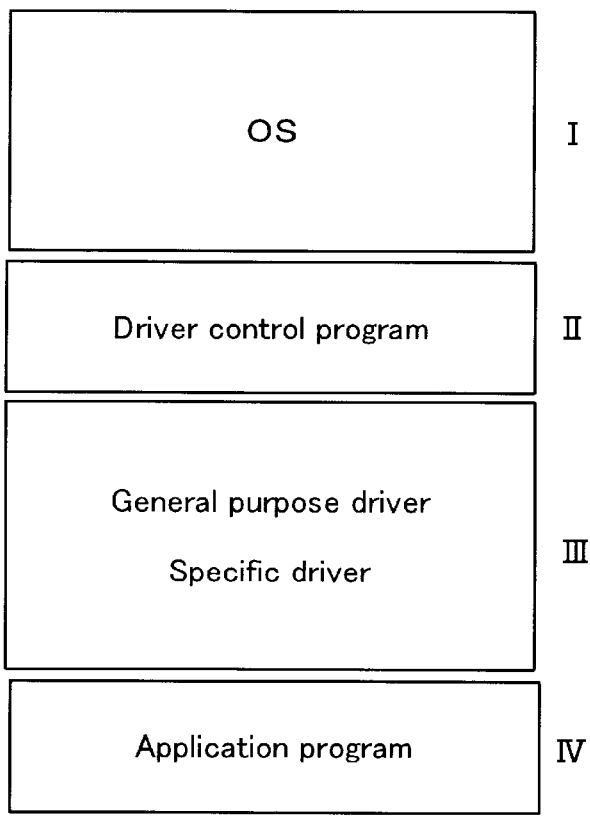
FIG. 3 shows the programs to be stored on hard disk drive unit 4 shown in FIG. 1.
FIG. 4 details a check command example.

When the OS is activated, the driver control program stored together with the OS on hard disk drive unit 4 issues a start-up request to a device driver (Step S2). As shown in FIG. 3, the present invention provides a specific driver having a specific function such as, for example, a high-speed function (hereinafter called the high-speed driver) as a device driver in addition to the general-purpose driver.

FIG. 3 shows the programs to be stored on hard disk drive unit 4 shown in FIG. 1. The OS is stored in memory address area I, and the driver control program is stored in address area II.

The general-purpose device driver and high-speed driver are stored in memory address area III, and application programs are stored in memory address area IV.

The high-speed driver recognizes a drive unit having the corresponding high-speed function as follows:

The device driver, requested to start up by the driver control program, issues a check command to the drive unit.

The following explains a check command as shown in FIG. 4.

That is, the check command has a 10-byte format, where 0Xf0, for example, is stored in relative position 0 as a command number. This command number represents a check command for a drive unit.

Furthermore, the check command has the transfer data length in relative position 8, indicating that the length of response data from a drive unit is 4 bytes.

When this type of check command for a drive unit is issued (Step S3), response data having the specified data length is returned from the drive unit.

That is, a drive unit, which can return the response data having the specified data length, returns to the high-level device a response of the specified data length containing a specific code as an attribute indication code. The drive unit that can return the response of the specified data length containing the specific code is included in specific group 9.

Figure 8:
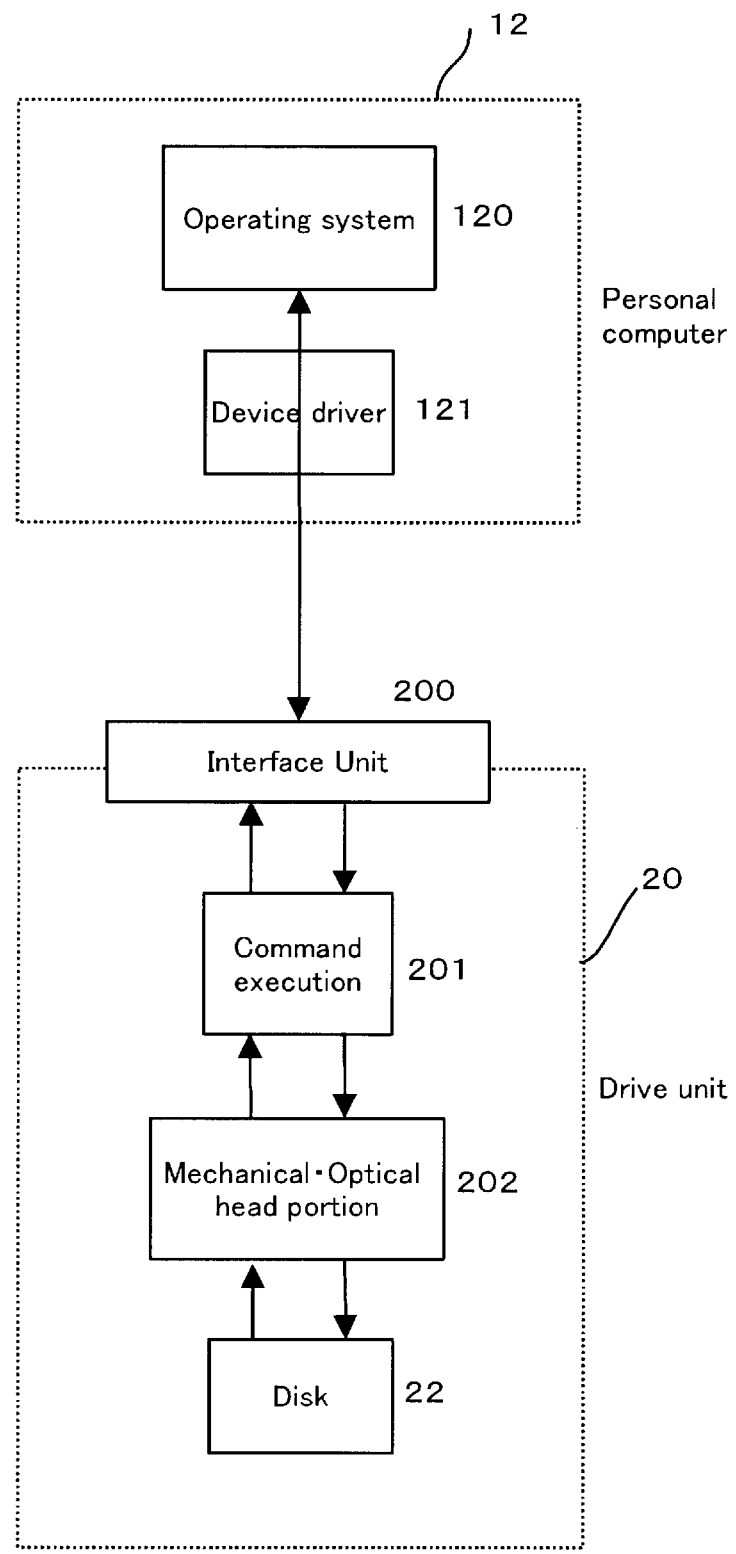
FIG. 8 shows the outline of the connection between personal computer main unit 12 operating as the main unit of the information processing equipment and MO drive 20 used as a drive unit example.

The drive unit having the high-speed function and included in specific group 9 contains the above specific code together with the response control program that controls response data to be returned in response to the check command in command processing section 201 of drive unit 20 shown in FIG. 8.

Figures 5, 6:
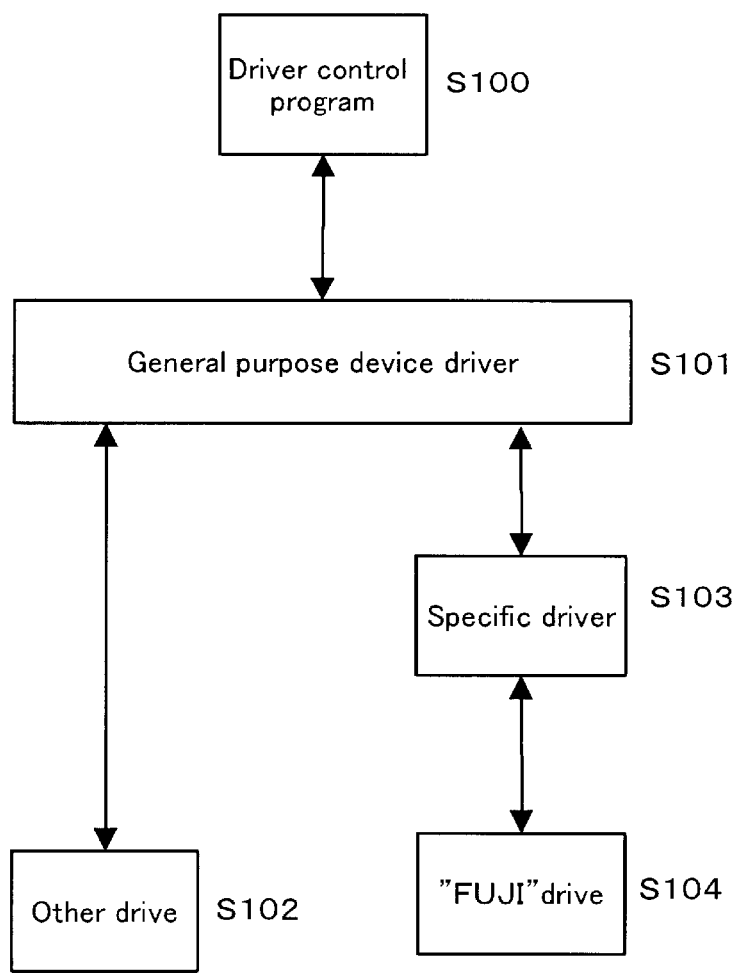
FIG. 5 shows the specific data in the response data format from the drive unit.
FIG. 6 is the flowchart of the read/write processing to be executed after the drive units included in group 9 are loaded.
Figure 7:
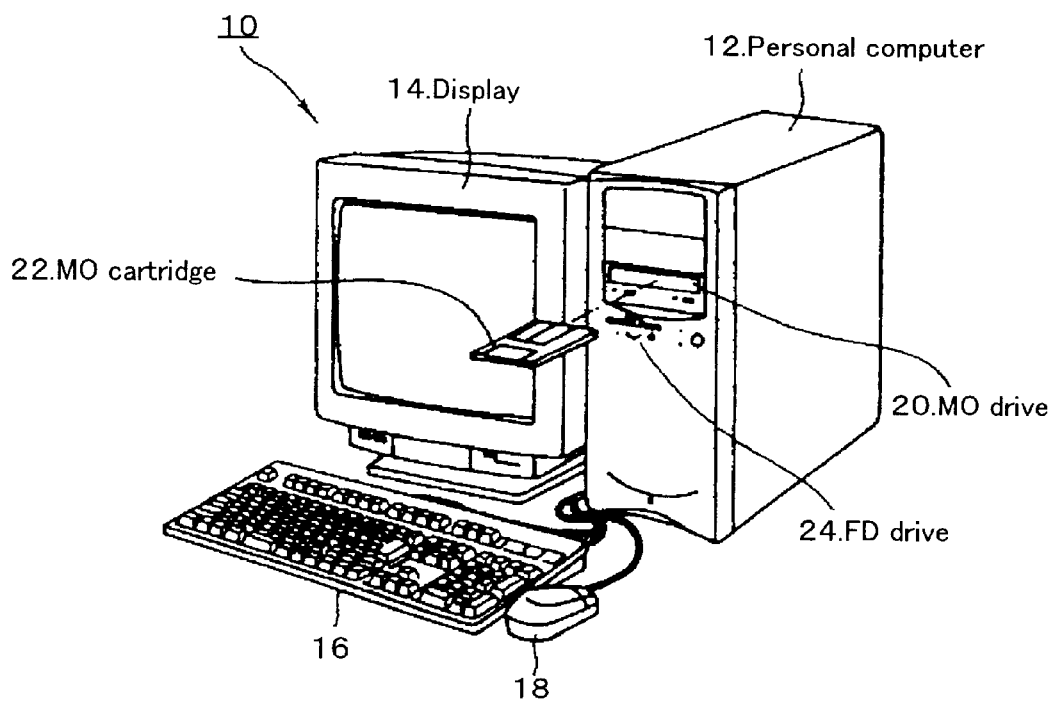
FIG. 7 shows a computer system example.

The pertinent response control program creates the response data shown in FIG. 5 in response to the check command so that it contains the specific code.

When the response data is received, the specific driver recognizes the specific code in the response data in accordance with the present invention (Step S4).

The specific code example shown in FIG. 5 contains the data "FUJI" in ASCII code in the 4-byte response data. Therefore, whether the response data contains the code "FUJI" is determined in Step 4.

When the code "FUJI" exists, it is recognized that the corresponding drive unit is included in group 9 in FIG. 1 and has the high-speed function as a specific function.

In FIG. 1, three devices are connected as driver units included in group 9; that is, having the high-speed function as a specific function. However, even when only one device or two or more devices are connected, the above processing conforming to the invention is executed similarly.

As described in the unexamined laid open patent publication No. 5-2550, when the power is turned on, the general-purpose device driver for general-purpose drive units connected to the I/O bus issues a command for drive units not included in group 9 and accessible by the general-purpose driver. Then, it can subsequently access the drive units by acquiring drive unit information.

As described above, the device driver requests the driver control program to load the drive unit into the system (Step S5). Then, the device driver becomes ready for execution for the drive unit into which a service is loaded after the OS is activated (Step 6).

The following explains read/write processing to be executed after the drive units included in group 9 are loaded into the high-level device, with reference to FIG. 6. When the drive units are loaded into the high-level device, the device information on the drive number units is also loaded into the high-level device.

For the drive units included in group 9 in the present invention, there is provided the function that converts a command for the drive units into its special function such as, for example, a high-speed read/write command.

Therefore, in the present invention, the specific driver function converts the command for the drive units to the high-speed read/write command to be effective for the drive units included in group 9 (Step S103).

The driver control program issues a start-up request to the general-purpose block device driver (Step S100). When the general-purpose device driver receives the start-up request, it specifies the number of a drive unit connected to I/O bus 8 and issues a read/write command to the drive unit.

At this point in time, the general-purpose device driver can issue the read/write command as is to a general-purpose drive unit (Step S102).

If the drive unit number corresponds to the drive units included in group 9, the specific driver executes processing for conversion to the high-speed read/write command (for example, command code 0xf1 or 0xf2: vendor code) (Step S103).

This makes it possible to execute high-speed read/write control for the drive units included in group 9 (Step S104).

As described above, the present invention specifies the common specific code for a specific group of drive units. Therefore, as far as the common specific code is contained, the specific driver, recognizing that code, can recognize the drive units included in the specific group even if those units exist together with drive units controlled by another general-purpose device driver.

Therefore, if a new drive unit is connected to the high-level device and included in the specific group, it can also be controlled with the above specific driver.

Explained above is the case where the read/write function of the drive units included in the specific group is performed. The present invention is not limited to such a case; another case will be now explained where a command termination time or time-out value is changed.

The time-out value differs for each drive unit. For example, the command terminates sooner on the hard disk drive unit having high-speed access and data transfer functions. However, it terminates later on the floppy disk drive unit having slow-speed access and data transfer functions.

That is, there is a time-out value appropriate for drive unit performance. Therefore, all drive units included in a specific group (drive unit group) sharing the time-out value can be recognized as described above.

When a drive unit group is set for a magneto-optic disk drive unit, the magneto-optic disk drive unit is later in command termination than the hard disk drive unit but sooner than the floppy disk drive unit. Therefore, the driver, designed to recognize the common specific code, can set a command termination time of 15 seconds for the magneto-optic disk drive unit included in the drive unit group in the information processing equipment whose command termination code is usually set to 10 seconds.

Even if new drive units included in the group are connected to the information processing system, the driver that has already been installed can function, recognizing the specific code. Therefore, new drivers do not need to be prepared, so drive unit manufacturers can reduce driver creation and distribution costs.

As explained above, referring to the drawings, the present invention allows the system to immediately induce drive unit performance even when newly developed drive units are connected to the system.

Therefore, system and drive manufacturers do not need to create a device driver corresponding to a new drive unit ID, resulting in cost reductions.

In the above explanation, the magneto-optic disk drive unit is used as an example; however, the invention is not limited to such a case; that is, the invention can, of course, apply to the other drive units.

What is claimed is:

1. A method for controlling access to drive units, each of which is assigned with a code indicating an attribute, and which are connected to a host device through interfaces, the method comprising the steps of:

generating a device driver start request by a driver control program when an Operating System starts;

sending a check command in accordance with the device driver start request to a plurality of drive units connected to the host device;

recognizing from the plurality of drive units, a specific group of drive units having returned responses to the check command, each of which responses contains a specific code;

loading a specific device driver corresponding to a specific code contained in the responses from the specific group of drive units; and sending a corresponding command to the specific group of drive units controllable by the specific device driver when a predetermined command for the specific group of drive units is sent from the host device.

2. The access control method according to claim 1, further comprising the step of:

converting the predetermined command into the corresponding command by the specific device driver when the predetermined command for the specific group of drive units is sent from the host device.

3. The method according to claim 1, wherein the check command includes at least a command number associated with a command, which recognizes the specific code, and transfer data length information, and a response from the specific group of drive units corresponding to the check command has data length determined by the transfer data length information and includes the specific code in the data length.

4. The method according to claim 1, wherein the specific code is commonly assigned to the group of drive units.

5. A drive unit of a specific group of drive units connected to a host device through an interface, comprising a functional part for storing and holding a specific code by which the specific group of drive units can be recognized when a plurality of drive units are connected to the host device, wherein an access control from the host device to the specific group of drive units is performed by the steps of:

generating a device driver start request by a driver control program when an Operating System starts;

sending a check command in accordance with the device driver start request to a plurality of drive units connected to the host device;

recognizing from the plurality of drive units, a specific group of drive units having returned responses to the check command, each of which responses contains a specific code;

loading a specific device driver corresponding to the specific code contained in the responses from the specific group of drive units; and sending a corresponding command to the specific group of driver units controllable by the specific device driver when a predetermined command for the specific group of drive units is sent from the host device.

6. Recording media provided in a host device, storing and holding device drivers for controlling accesses to a plurality of drive units connected to the host device through interfaces;

wherein an access control form the host device to the plurality of drive units is performed by the steps of:

generating a device driver start request by a driver control program when an Operating System starts;

sending a check command in accordance with the device driver start request to a plurality of drive units connected to the host device;

recognizing from the plurality of drive units, a specific group of drive units having returned responses to the check command, each of which responses contains a specific code;

loading a specific device driver corresponding to the specific code contained in the responses form the specific group of drive units; and sending a corresponding command to the specific group of drive units controllable by the specific device driver when a predetermined command for the specific group of drive units is sent from the host device.

* * * * *